Figure 1:
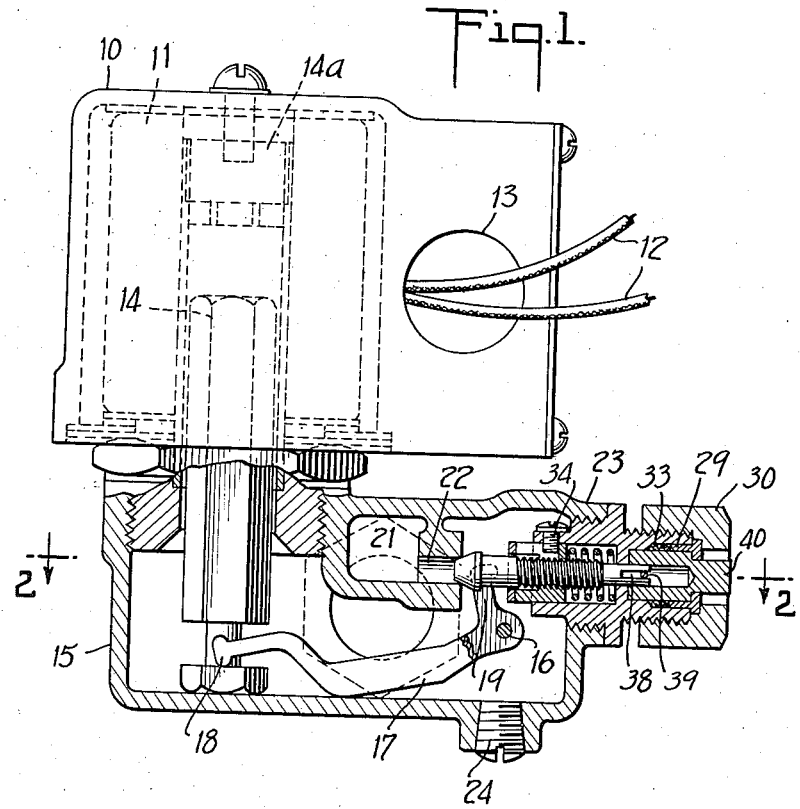

Aug. 8, 1939.  W. F. HURLBURT  2,168,774
SOLENOID VALVE
Filed July 8, 1938  2 Sheets-Sheet 1

INVENTOR
WILBUR F. HURLBURT
BY
Gluck Autenfeld
ATTORNEYS

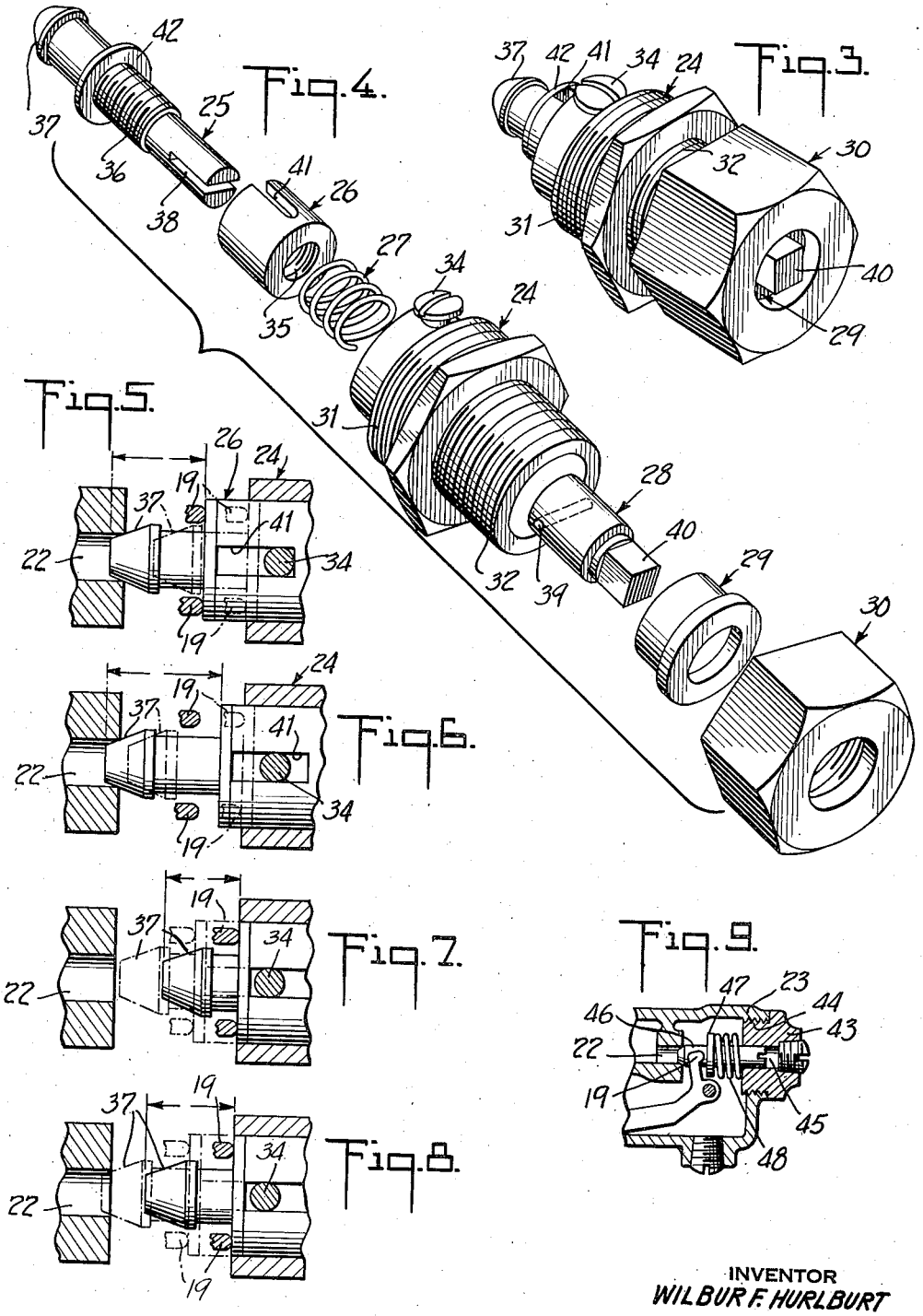

Patented Aug. 8, 1939

2,168,774

UNITED STATES PATENT OFFICE 2,168,774

SOLENOID VALVE

Wilbur F. Hurlburt, East Orange, N. J., assignor to Automatic Switch Co., New York, N. Y.

Application July 8, 1938, Serial No. 218,113

7 Claims. (Cl. 251—134)

My present invention relates generally to valves and has particular reference to solenoid valves.

My invention will be more fully appreciated by pointing out preliminarily, that differing requirements in oil-burner installations, and in other fields, have heretofore been met by the employment of different types of valves commercially known as (a) shut-off valves, (b) adjustable main flow valves, and (c) adjustable by-pass valves. Briefly, the plain type of shut-off valve consists essentially of a movable valve member which either seats or unseats itself with respect to a valve seat. When seated, the flow of fluid through the valve is completely shut off, and when unseated, a predetermined flow ensues. The so-called adjustable main flow valve aims to provide the same general type of operation, except that the amount of fluid flow, when the valve member is unseated, is regulable. The function of the so-called adjustable by-pass valve is to permit a relatively small flow of fluid (to feed a pilot flame, for example) when the valve is otherwise shut.

Heretofore, these valves have been structurally distinct and different, the valve bodies, as well as the internal parts, differing from one another. Each of such customary valves is therefore limited to the single purpose for which it is designed, and a manufacturer aiming to meet the demand for different valve functions has heretofore been required to make various distinct types, each involving its own accompanying expense of individual design and initial cost of development.

It is a general object of my present invention to provide an improved valve, the features of which are particularly applicable to solenoid-controlled operation, whereby relatively simple and inexpensive adjustments permit the ready adaptation of the valve to any selected mode of functioning. A single valve body may thus be employed for several distinct purposes, without disturbing the operating solenoid or its attachments, and by relatively simple interchange or adjustment of inexpensive small parts. In fact, my invention is of such a character that these changes or adjustments may be feasibly made in the field while the valve proper remains connected to pipe lines.

In the ordinary types of adjustable main flow and adjustable by-pass valves, it is customary to provide an auxiliary adjustable port, along with a main valve member which seats and unseats itself with respect to a valve seat. In the case of the adjustable main flow valve, the auxiliary port regulates the amount of fluid flow when the main valve member is unseated. In the adjustable by-pass valve, the auxiliary port permits the flow, through a by-pass connection, of a relatively small amount of fluid, when the main valve member is seated. In each case, difficulty is frequently encountered in operation, because of the fact that impurities in the fluid may have a tendency to clog the auxiliary port, especially when the adjustment aims to provide for a relatively small flow.

It is a further feature of the present invention to provide a construction which is virtually self-cleaning, and which operates to fulfill its selected function without the requirement for, and the accompanying disadvantages of, any adjustable auxiliary port.

Briefly, my invention is characterized by the employment of a valve body which includes a valve seat in its interior, and which is provided in a wall thereof with a threaded opening in axial alignment with the valve seat, this opening being adapted removably to receive a unitary assembly which comprises a main element in the form of a bearing within which a valve member is adapted to move toward and away from the valve seat. Where the valve is intended to be used as an ordinary shut-off valve, the bearing may be of a relatively simple character, adapted to accommodate a relatively simple valve member, arranged to seat and unseat itself under the alternate action of a yieldable means, such as a spring, and a solenoid-controlled actuator arranged within the valve body.

Where the valve is intended to be used as the equivalent of the so-called adjustable main flow valve, or as the equivalent of the so-called adjustable by-pass valve, the removably applicable bearing is additionally provided with associated parts which permit selective variation of the effective length of the valve member. More particularly, a means is provided, which is controllable from the exterior of the valve, for varying the effective length of the valve member, so that the latter may be selectively caused either to seat and unseat itself, relatively to the valve seat, or to remain unseated and merely varying the effective opening of the valve.

This general objective is achieved, preferably, by the construction of the valve member in the form of two adjustably united elements, which may for example assume the form of two mutually threaded elements, whereby the adjustment or turning of one element relative to the other will alter the effective length of the valve member.

Figure 2:
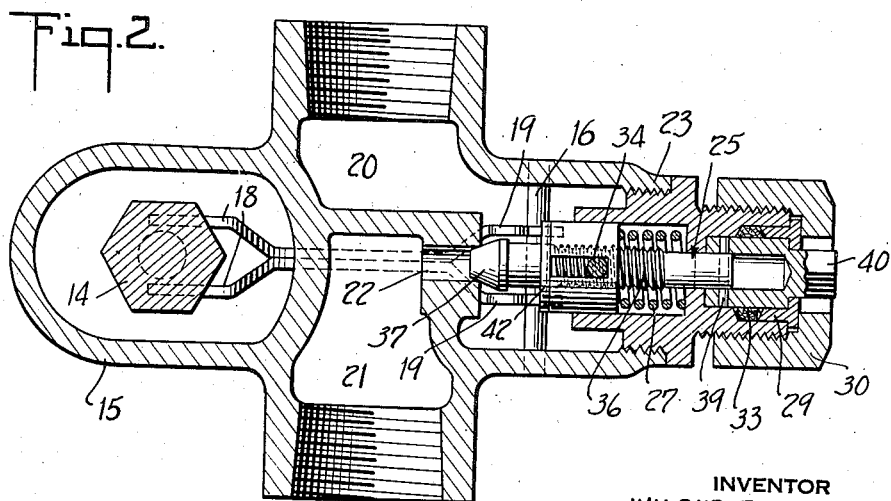

I achieve the foregoing general objects, and such other objects as may hereinafter appear or be pointed out, in the manner illustratively exemplified in the accompanying drawings, wherein:

Figure 1 is an elevational view partly in section through a solenoid valve embodying the features of the present invention, Figure 2 is a slightly enlarged view taken substantially along the liine 2—2 of Figure 1, Figure 3 is a perspective view of the unitary valve member assembly shown in Figures 1 and 2, Figure 4 is an exploded view of the elements of Figure 3, Figure 5 is a fragmentary enlarged view showing the functioning of the valve member when the valve is adapted for use as an adjustable main flow valve, Figure 6 is a view similar to Figure 5 showing the functioning when the flow is reduced relative to Figure 5, Figure 7 is a view similar to Figure 5 showing the mode of functioning when the valve is arranged to operate as the equivalent of the adjustable by-pass valve, Figure 8 is a view similar to Figure 7 with the valve adjustable to a reduced "by-pass" flow, relative to Figure 7, and Figure 9 is a cross sectional view similar to the lower right hand portion of Figure 1 illustrating an alternative bearing and valve member.

I have shown a conventional type of magnet cup 10 within which there is mounted an operating coil 11 furnished with suitable electric current through the leads 12 which pass into the cup 10 through an opening 13. The reference numeral 14a is applied to the conventional fixed core of the solenoid. The movable core 14 passes into the valve body 15 and is shown in deenergized position.

Mounted in the valve body 15 for pivotal movement around the pivot shaft 16, is the operating lever 17 whose forked rear end 18 engages with the lower end of the core 14. The forked forward end 19 of the lever 17 thus serves as a solenoid-controlled actuator of fixed throw. This actuator regularly moves between the two positions shown in each of Figures 5—8, whenever the solenoid is energized and deenergized.

The interior of the valve body 15 is constructed with suitable walls and webs to provide a chamber 20 and a chamber 21, these chambers being connected by a port 22. One of these chambers is the inlet and the other the outlet.

The end of the port facing toward the right, as viewed in Figures 1 and 2, constitutes a valve seat, and the valve body 15 is provided with a threaded opening 23 in axial alignment with this valve seat. The valve body is also preferably provided with the drain plug 24.

Removably fitting into the threaded opening 23 is a unitary assembly of parts shown most clearly in Figures 3 and 4. The parts entering into this unit are, briefly a bearing 24, a valve member elements 25 and 26, a yieldable means 27, an adjusting means 28, a gland 29, and a gland nut 30.

The bearing 24 has a threaded portion 31 which fits snugly into the threaded opening 23. It also has a rear threaded portion 32 adapted to receive the gland nut 30, and adapted to accommodate packing 33 and the gland 29, as shown in Figures 1 and 2. The bore of the bearing 24 is divided into inner and outer portions. The inner portion accommodates the spring 27 and the element 26; the outer portion accommodates the adjusting stem 28; the midportion is narrowed and permits passage of only the rear end of the element 25. A stop or abutment in the form of a threaded pin 34, projects radially into the inner portion of the bore.

The elements 25 and 26 conjointly constitute the valve member. They are adjustably united so that the effective length of the valve member may be varied. In the preferred construction the element 26 is interiorly threaded as at 35, and the element 25 is exteriorly threaded as at 36 so that when these two elements are threaded together they constitute a single unit whose effective length may be varied by turning one element relative to the other.

The element 25 is conically shaped at its forward end, as at 37, this portion serving as the valve proper, adapted to seat and unseat itself with respect to the valve seat. At its rear end, the element 25 is provided with the diametric slot 38 adapted to receive the pin 39 mounted on the interior of the adjusting stem 28. The latter constitutes a rotatable element which is thus in splined relation to the element 25.

The rear end of the element 28 is preferably squared as at 40 so that it may receive a suitably shaped key by means of which it may be rotated.

The gland 29 and the gland nut 30 are fitted around the element 28 so that the latter is enclosed in a liquid tight manner with only the squared end 40 accessible from the outside, as indicated in Figures 1, 2 and 3.

The element 26 fits slidably within the bore in the bearing 24, with the spring 27 serving as a means for urging the element 26 in the direction of the valve seat. This movement of the element 26 is limited however by virtue of the fact that the rear end of the slot 41 encounters the abutment pin 34.

Preferably, a washer 42, of the same exterior diameter as the element 26, is loosely mounted upon the element 25.

After these parts have been assembled they form a unitary device of the character shown in Figure 3. This device consists essentially of a bearing removably applicable to the valve body, and a valve member mounted for reciprocating movement in the bearing and of variable effective length. By merely applying this unit to the valve body 15, the resultant valve may be caused to function, at will, in any of a variety of ways.

For example, reference will first be had to Figures 5 and 6. In Figure 5, the parts have been adjusted so that when the solenoid is deenergized the plug 37 assumes the full line position in which the port 22 is closed; and in which the plug 37 moves into the dot and dash position when the solenoid is energized.

In Figure 6, however, the effective length of the valve member has been changed so that when the solenoid is energized the plug 37 moves a lesser distance from the valve seat, as shown in dot and dash lines.

A comparison of the distance between the arrows of Figure 5, with the distance between the arrows of Figure 6, serves to illustrate the difference between the effective length of the valve member in the one case, and the effective length in the other case. It will be observed that the effective length of the valve member is greater in Figure 6 than in Figure 5. It is as a result of this variation in effective length that the valve opens a lesser amount in Figure 6, when the solenoid is energized, than it does in Figure 5.

Figures 5 and 6 illustrate the manner in which the present construction may be used as the equivalent of an adjustable main flow valve. In actual practice, the adjustment is made as follows: with the solenoid deenergized the adjustable stem 28 is rotated to make sure that the spring 27 is causing the plug 37 to seat against the valve seat. The solenoid is then energized, and the adjusting stem 28 is rotated until the desired flow is secured. Thereafter, whenever the solenoid is deenergized the valve will be completely closed and whenever the solenoid is energized the valve will open accurately to the previously-adjusted flow position.

It will be observed that this adjustment is extremely simple, and that it can be effected in the field, without requiring any dismantling of parts or any disconnection of pipe lines.

In Figures 7 and 8 I have illustrated the manner in which the valve may be caused to function as the equivalent of a so-called adjustable by-pass valve.

In Figure 7, the plug 37 assumes the full line retracted position when the solenoid is energized, and assumes the dot and dash position when the solenoid is deenergized. In the dot and dash position, the valve opening remains open by a relatively small amount, thereby permitting the continued flow of a predetermined relatively small amount of fluid.

In Figure 8, the effective length of the valve member has been increased, so that in moving to the dot and dash position, when the solenoid is deenergized, the plug 37 approaches somewhat closer to the valve seat. This produces a lesser flow of fluid during those periods when the solenoid is deenergized.

A comparison of the distance between the arrows of Figure 7, with the distance between the arrows of Figure 8, serves to indicate the difference between the effective length of the valve member in the one case, and the effective length of the valve member in the other case.

In actual practice, the adjustment of the parts to function as in Figures 7 or 8, is as follows: with the solenoid deenergized, the adjusting stem 28 is turned until the valve is partially opened to the desired amount of "by-pass" flow. As a result, when the solenoid is energized, the plug is pushed entirely away from the valve seat and full flow results, whereas when the solenoid is deenergized, the plug returns accurately to the partly-open position which allows the limited flow for which the device was set.

Here again, it will be observed that the adjustment is relatively simple, and may be effected in the field, without in the least affecting the pipe connections.

In each of Figures 5-8 it should be noted that the throw of the actuator 19 is the same. This travel of the actuator is constant in all cases and it is only the variation in the effective length of the valve member which produces the desired variations in functioning.

It should also be observed that the disadvantages of an auxiliary port are completely obviated. There is no likelihood of any clogging, because the repeated movements of the valve member toward and away from the valve seat serve to break up and dislodge any impurities that might otherwise cause difficulty.

Where it is desired to use the present construction solely as an ordinary shut-off valve, it is quite feasible to use the unit of Figure 3. For example, the functioning of the valve as shown in either Figure 5 or Figure 6 is the functioning of an ordinary shut-off valve.

However, for economical reasons, where the valve is to be used for pure shut-off purposes, it is not necessary to employ the unit of Figure 3, with its adjustable features, and it may be preferable to furnish the valve with the relatively simple bearing 43 of Figure 9. This bearing has a threaded portion 44 which is identical with the threaded portion 31 of Figure 4, so that the bearing may be removably applied to the opening 23 in exactly the same way. The bearing 43 is relatively simple, however, having merely a bore 45 in which a valve member 46 is reciprocable. This valve member is not adjustable in effective length. It is provided with a shoulder 47 against which a spring 48 presses. The spring tends to push the valve member 46 against the valve seat, as shown in Figure 9, and actually holds this valve member against the valve seat whenever the solenoid is deenergized. When the solenoid becomes energized, the actuator 19 presses against the shoulder 47 to push the valve 47 outwardly, thereby opening the valve.

In general, it will be understood that changes in the details, herein described and illustrated for the purpose of explaining the nature of my invention, may be made by those skilled in the art without departing from the spirit thereof and the scope of the invention as expressed in the appended claims. It is therefore intended that these details be interpreted as illustrative, and not in a limiting sense.

Having thus described my invention, what I claim as new and desire to secure by Letters Patent is—

1. In a valve structure, a valve body including a valve seat, a bearing removably mounted in said body at a fixed distance from said seat, a valve member mounted in said bearing for movement toward and away from said seat, said valve member comprising a pair of mutually threaded elements, yieldable means urging the valve member in one direction, a valve actuator of constant throw mounted in the valve body and adapted to move the valve member in the other direction, means for turning one of said elements relative to the other to vary the effective length of the valve member, said means comprising a rotatable stem splined to the outer end of one of said elements, and liquid-tight means for enclosing all but the end of said stem, whereby the variation of the effective length of the valve member is controllable from the exterior of the valve.

2. In a valve structure, a valve body including a valve seat in its interior, said valve body being provided in its wall with a threaded opening in axial alignment with said seat, a threaded bearing removably mounted in said opening, a valve member mounted in said bearing for reciprocal movement toward and away from said valve seat, yieldable means urging said valve member toward said seat, a valve actuator within said valve body adapted to move said valve member in a direction away from said seat, and means associated with said bearing and controllable from the exterior thereof for varying the effective length of said valve member.

3. In a valve structure, a valve body including a valve seat within said body, a valve member mounted in said body for reciprocatory movement and comprising front and rear elements in threaded interengagement, said front element having an operative end adapted to cooperate with said valve seat by movement toward and away from said seat when the valve member is reciprocated, yieldable means constantly urging that rear element toward the valve seat, unyielding means limiting the movement of said rear element toward the valve seat, a valve actuator of constant throw mounted in the valve body to engage said rear element and move it away from the valve seat, and means for rotating said elements relative to each other to vary the position of said operative end relative to the rear element.

4. In a valve structure, a valve body including a valve seat within said body, a bearing removably mounted in the wall of said body at a fixed distance from said seat, a valve member mounted in said bearing for movement toward and away from said seat, yieldable means constantly urging the valve member toward the valve seat, a valve actuator of constant throw mounted in the valve body to encounter said valve member and move it away from the valve seat, means for varying the effective length of said valve member, and means uniting said bearing, valve member, yieldable means, and length-adjusting means as a unitary assembly.

5. In a valve structure, the combination set forth in claim 4, said valve member comprising a pair of elements in threaded interengagement, and said length-adjusting means being operative to rotate one of said elements relative to the other.

6. In a valve structure, a valve body including a valve seat within said body, a valve member mounted at a fixed distance from said seat for movement toward and away from said seat, yieldable means urging the valve member toward said seat, unyielding means independent of the seat for limiting the movement of the valve member toward the seat, a valve actuator of constant throw mounted in the valve body for moving the valve member away from the seat, and means for varying the effective length of said valve member, whereby the valve member may be selectively caused to seat and unseat, or to remain unseated and merely vary the effective valve opening.

7. In a valve structure, the combination set forth in claim 4, and a stop carried by said bearing for limiting the movement of the valve member toward said seat.

WILBUR F. HURLBURT.